US008619632B2

(12) United States Patent
Martinotti

(10) Patent No.: US 8,619,632 B2
(45) Date of Patent: Dec. 31, 2013

(54) COMMUNICATIONS NETWORK WITH ENHANCED NOTIFICATION FOR TOPOLOGY CHANGE

(75) Inventor: Riccardo Martinotti, Savona (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 99 days.

(21) Appl. No.: 13/139,285

(22) PCT Filed: Dec. 11, 2008

(86) PCT No.: PCT/EP2008/067347
§ 371 (c)(1),
(2), (4) Date: Aug. 25, 2011

(87) PCT Pub. No.: WO2010/066300
PCT Pub. Date: Jun. 17, 2010

(65) Prior Publication Data
US 2012/0014291 A1    Jan. 19, 2012

(51) Int. Cl.
*H04L 12/28*    (2006.01)
(52) U.S. Cl.
USPC .......................... 370/255; 370/256; 370/401
(58) Field of Classification Search
USPC .......... 370/252, 254, 255, 256, 392, 412, 428
See application file for complete search history.

(56) References Cited

U.S. PATENT DOCUMENTS 6,567,403 B1 * 5/2003 Congdon et al. ............. 370/389
6,801,506 B1   10/2004 Dey
6,820,134 B1   11/2004 Zinin et al.
7,277,399 B1 * 10/2007 Hughes, Jr. .................. 370/252
7,545,755 B2 *  6/2009 Fan et al. ..................... 370/254
7,984,137 B2 *  7/2011 O'Toole, Jr. et al. ......... 709/224
8,031,630 B2 * 10/2011 Elie-Dit-Cosaque et al. 370/254
2003/0165119 A1   9/2003 Hsu et al.
2012/0020207 A1 *  1/2012 Corti et al. .................. 370/225

FOREIGN PATENT DOCUMENTS

EP    1455510 A2    9/2004
EP    1727313 A1   11/2006
WO    0028685 A1    5/2000

OTHER PUBLICATIONS

International Search Report, Application No. PCT/EP2008/067347, dated Sep. 28, 2009, 5 pages.
Minh Huynh et al., "A Scalable Hybrid Approach to Switching in Metro Ethernet Networks," 32nd IEEE Conference on Local Computer Networks, Oct. 1, 2007, 436-443 pages, IEEE Computer Society.

* cited by examiner

*Primary Examiner* — Brian O'Connor
(74) *Attorney, Agent, or Firm* — Blakely Sokoloff & Taylor & Zafman LLP

(57) ABSTRACT

A node for a communications network, the node comprising a plurality of ports and a processor. The processor configured to determine that a first status change signal, indicative of a topology status change in the network, has been received, and the processor configured to decide from at least an origin of the first status change signal to output a second status change signal to only a subset of possible destination nodes.

14 Claims, 6 Drawing Sheets

COMMUNICATIONS NETWORK WITH ENHANCED NOTIFICATION FOR TOPOLOGY CHANGE

CROSS-REFERENCE TO RELATED APPLICATIONS

This application is a National stage of International Application No. PCT/EP2008/067347, filed Dec. 11, 2008, which is hereby incorporated by reference.

TECHNICAL FIELD

The present invention relates to communications networks.

BACKGROUND

In connectionless Ethernet Networks, Spanning Tree Protocol (STP), and in particular Rapid Spanning Tree Protocol (RSTP), is used to determine a loop-free active infrastructure in which redundant network resources are present. An example of network topology is the ring topology, where RSTP determines an alternative link when forwarding of user data is stopped. STP and RSTP can be implemented in other network topologies, for example the meshed and hierarchical network topology types.

A specific behaviour of STP, and in particular of RSTP, is that when the active topology changes (generally because of an Ethernet link status is increasing or decreasing) a sequence of notifications reaches all of the nodes, generating flushes in the Forwarding Database (FDB) of almost all the interfaces of each node. Here, flushing involves removing from the FDBs some dynamic entries, each of them correlating a Media Access Control (MAC) address to a bridge port of a bridge (i.e. a node), a relationship established by a learning procedure of each bridge.

This behaviour is undesirable because it causes unwanted flushing and subsequent flooding in many of the nodes of the network. Flooding involves broadcasting a frame to all the bridge ports that are in the member set of a particular Virtual Local Area Network (VLAN). This potentially generates a large amount of traffic using bandwidth in the network. This is particularly undesirable when the topology implies changes of path for only a reduced zone of the network (near to the node which notifies the topology change).

SUMMARY

The present inventor has realised that it can be desirable to restrict the extent to which status change signals such as notifications are sent. For example, in particular embodiments on the status change signals are sent only to nodes in the zone of the network where needed.

According to one aspect of the invention there is provided a node for a communications network. The node comprises a plurality of ports and a processor, the processor configured to determine that a first status change signal, indicative of a topology status change in the network, has been received. The processor also configured to decide from at least an origin of the first status change signal to output a second status change signal to only a subset of possible destination nodes.

Outputting the second status change signal to only a subset of destination nodes (instead of to all nodes) can thus decrease the destination nodes to which the second status change signal is sent. For example, this can advantageously limit the extent of flooding and/or flushing activity resulting from a determined topology change in the network.

The processor may be configured to determine at which port of the node to output the second status change signal based on said at least on origin of the first status change signal.

The processor may be configured to output the second status change signal from a subset of the ports of the node based on said at least on origin of the first status change signal.

The processor may be configured to inhibit the second status change signal being output to at least one particular destination based on said at least on origin of the first status change signal.

The node may comprise a memory configured to store associations between traffic destination identifiers and ports of the node. On receipt of the first status change signal the processor configured to remove from the memory an association relating to a port from which a second status change signal is to be sent, and to retain in the memory an association relating to a port which the processor has inhibited the second status change signal from being sent.

The second status change signal may comprise data indicative of the origin of the first signal. Data indicative of the origin of the first status change signal may comprise an identifier relating to the port of the node at which the first status change signal is received.

The processor may be configured to determine the origin of the first status change signal on the basis of which port of the node the first status change signal was received.

The processor may be configured to determine the origin of the first status change signal on at least the basis of information in the first status change signal.

The topological status change signal may be indicative of a fault event.

The processor may be configured to implement a spanning tree protocol for routing traffic.

According to another aspect of the invention there is provided a traffic interface for a node of a communications network. The interface is arranged to store an attribute indicative of the interface being in one of a plurality of link connect states. Said plurality of link connect states comprise: (a) the interface connected to a particular subnetwork of the network, and, (b) the interface connected to an intermediary node, the intermediary node located intermediate of subnetworks of the network.

The attribute may comprise one of a plurality of attribute identifiers indentifying a particular subnetwork.

The attribute may comprise human-readable data associated with a respective attribute identifier, the data allowing a human to identify said subnetwork.

The plurality of link connect states may further comprise: (c) the interface is not connected to a portion of the network over which a predetermined spanning tree protocol is implemented for routing traffic.

According to another aspect of the invention there is provided a node comprising a traffic interface of the preceding aspect of the invention.

According to a further aspect of the invention there is provided a communications network comprising a node of either of the preceding aspects of the invention.

The node of the communications network may be an intermediary node, the intermediary node located intermediate of at least two subnetworks of the network, and the intermediary node connected to at least one node of each of the subnetworks.

The communications network may comprise a further intermediary node, the intermediary nodes connected by a communications link.

Another aspect of the invention relates to a method of operation of a node of a communications network. The node comprises a plurality of ports and a processor. The method comprises determining that a first status change signal, indicative of a topology status change in the network, has been received by the node. The method further comprises deciding from at least an origin of the first status change signal, to output a second status change signal from the node to only a subset of the possible destination nodes.

The method may comprise including in the second status change signal data indicative of the origin of the first status change signal.

The method may comprise determining the origin of the first status change signal at least on the basis of which part of the node received the first status change signal.

The method may comprise implementing a spanning tree protocol for routing traffic.

A further aspect of the present invention provides a method of operation of a traffic interface for a node. The method comprises the interface storing an attribute indicative of the interface being in one of a plurality of link connect states. The plurality of link connect states comprise: (a) the interface connected to a particular subnetwork of the network, and (b) the interface connected to an intermediary node, the intermediary node being located intermediate of subnetworks of the network.

The plurality of link connect states may comprise: (c) the interface is not connected to a portion of the network (100) over which a predetermined spanning tree protocol is implemented for routing traffic.

Yet a further aspect of the invention relates to machine-readable instructions for a node for a communications network. The instructions, when loaded onto the node, configure a processor of the node to perform any of the above methods.

BRIEF DESCRIPTION OF THE DRAWINGS

Various embodiments of the invention will now be described, by way of example only, with reference to the following drawings in which.

DETAILED DESCRIPTION

Figure 1:
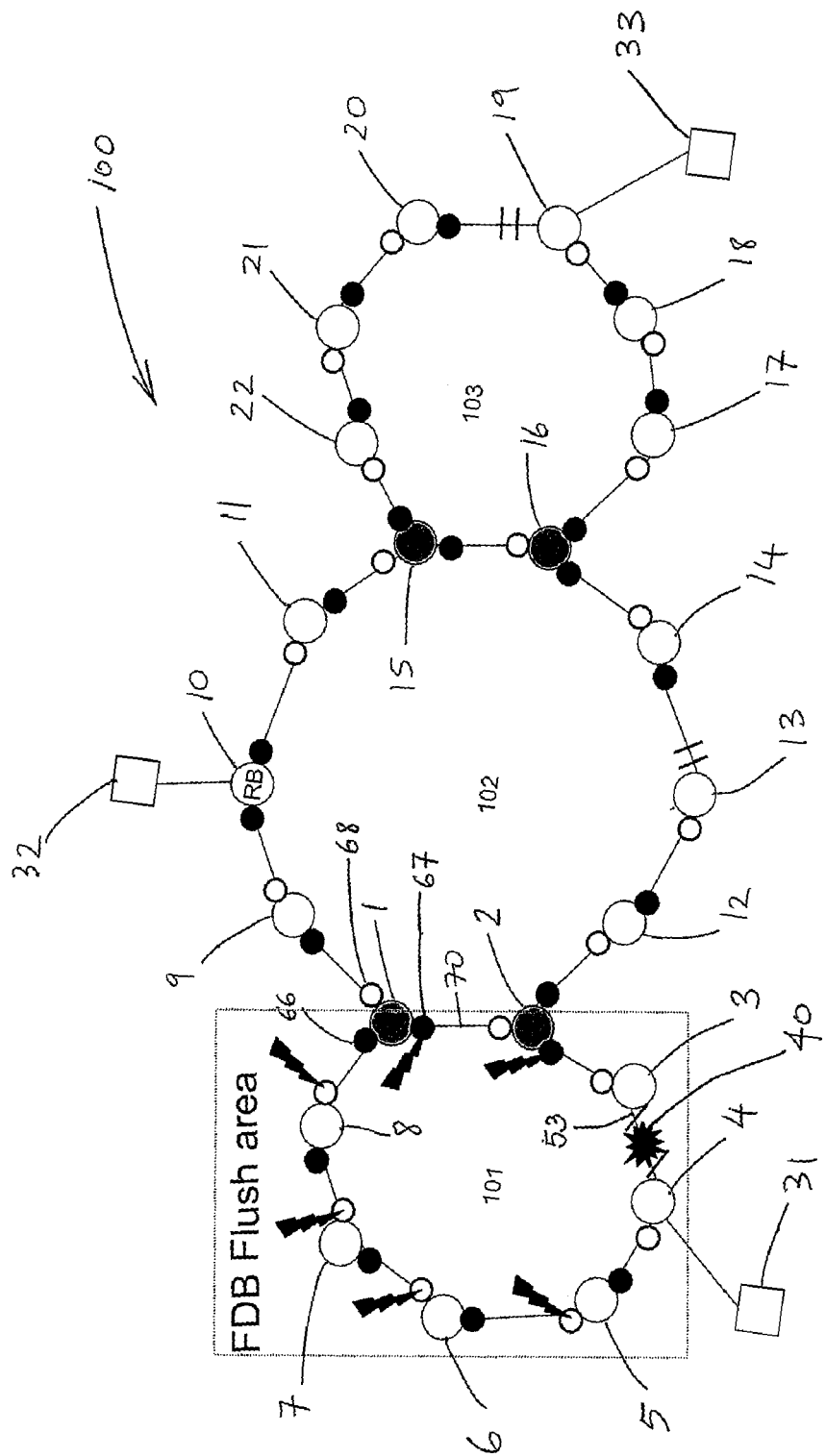
FIG. 1 shows a communications network

FIG. 1 shows a communications network 100 which may be considered as comprising three subnetworks (or sub-domains) 101, 102 and 103. Each subnetwork comprises a respective subset of the set of nodes and respective communication links of the network 100. The subnetworks 101, 102 and 103 are separated by intermediary nodes 1, 2, 15 and 16. The intermediary nodes 1 and 2 are intermediate of the subnetworks 101 and 102, and the intermediary nodes 15 and 16 are intermediate of the subnetworks 102 and 103.

The network 100 comprises nodes 1 to 22 (and the various communications links) configured to implement the Rapid Tree Spanning Protocol (RTSP) for defining an active topology for routing traffic through the network. RSTP results in the filtering/forwarding database (FDB) of each node being populated with associations between destination identifiers of received traffic and an output port (of the respective node). This database is created by way of a so-called learning phase in which each node learns from which port of the node to output received traffic with a particular destination so as to reduce broadcasting of traffic, avoiding creation of traffic loops.

The nodes 31, 32 and 33 are customer nodes, and each may comprise a customer computer terminal, or network equipment such as a hub, switch or router.

When a change in topology occurs, a node adjacent to the change detects the change. The node then outputs a Bridge Protocol Data Unit (BDPU) signal along a communications link to a neighbouring node. The BDPU signal comprises a (first) status change signal in the form of a Topology Change Notification (TCN) which identifies to the recipient node that a change in topology status has occurred. The recipient node then wipes (or 'flushes') its FDB in respect of those stored destination identifiers which have been associated with the port from which a further BDPU signal with a TCN (i.e. a second status change signal) is to be output by the recipient node. As will be described in detail below, the nodes 1 and 2, and the nodes 15 and 16 are advantageously configured to ensure that the number of nodes which output TCN's, and as a consequence the number of nodes which are caused to wipe their FDB's, is minimised It will be appreciated that a topology change of the network may be due to a fault of a node, a fault of a communications link connecting nodes or may be due to a decease in operational capacity of a node or a communications link connecting nodes.

Each of the intermediary nodes 1, 2, 15 and 16 comprises processor 61, a memory 62 and a cross-connect switch 63. The cross-connect switch 63 is controlled by the processor 61, and is operative to connect traffic or signalling received at one of the ports 66, 67 and 68 to another of the ports. The processor 61, in conjunction with data stored in the memory 62, is operative determine when a BDPU with a TCN is received at any of the ports 66, 67 and 68. The processor then determines which entries of its FDB are to be wiped and from which subset of ports of the node a BDPU with a TCN should be output.

With reference again to FIG. 1, the sequence of events after a fault 40 in a communications link 53 between the node 3 and the node 4 is considered. The sequence of events is as follows:
  link 53 fails,
  node 4 determines that a fault has occurred in the link 53,
  node 4 outputs a TCN to node 5,
  node 5 wipes entries in its FDB related to its port towards the node 6,
  the node 5 outputs a TCN to the node 6,
  the node 6 wipes entries in its FDB related to its port towards the node 7,
  the node 6 outputs a TCN to the node 7,
  the node 7 wipes entries in its FDB related to its port towards the node 8,
  the node 7 outputs a TCN to the node 8,
  the node 8 wipes entries in its FDB related to its port towards the node 1,
  the node 8 outputs a TCN to the node 1,
  the node 1 wipes entries in its FDB related to its port 67 towards the intermediary node 2,
  the node 1 does not wipe entries in its FDB related to its port 68 towards the node 9,
  the node 1 outputs a TCN to the intermediary node 2,
  the node 1 does not send a TCN to the node 9
  the node 2 wipes entries in its FDB related to its port towards the node 3,
  the node 2 outputs a TCN to the node 3,
  the node 2 does not send a TCN to the node 12.

Figure 2:
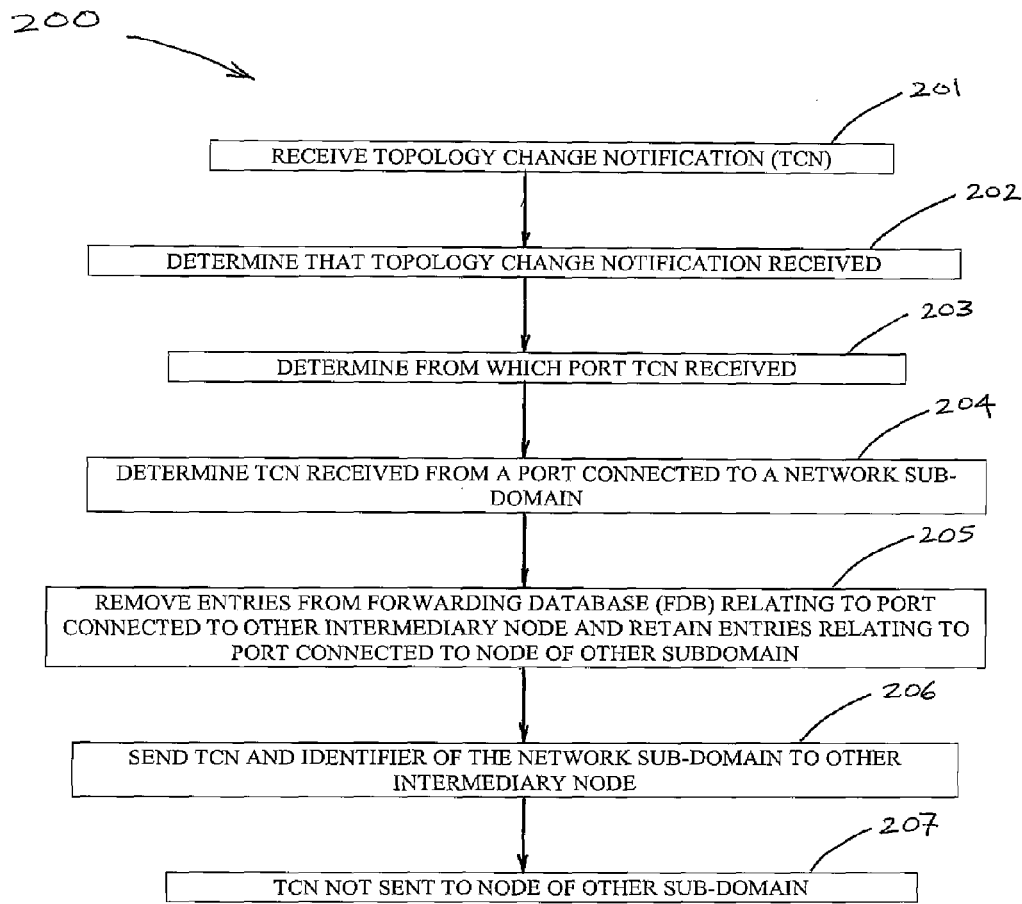
FIG. 2 is a flow diagram
Figure 3:
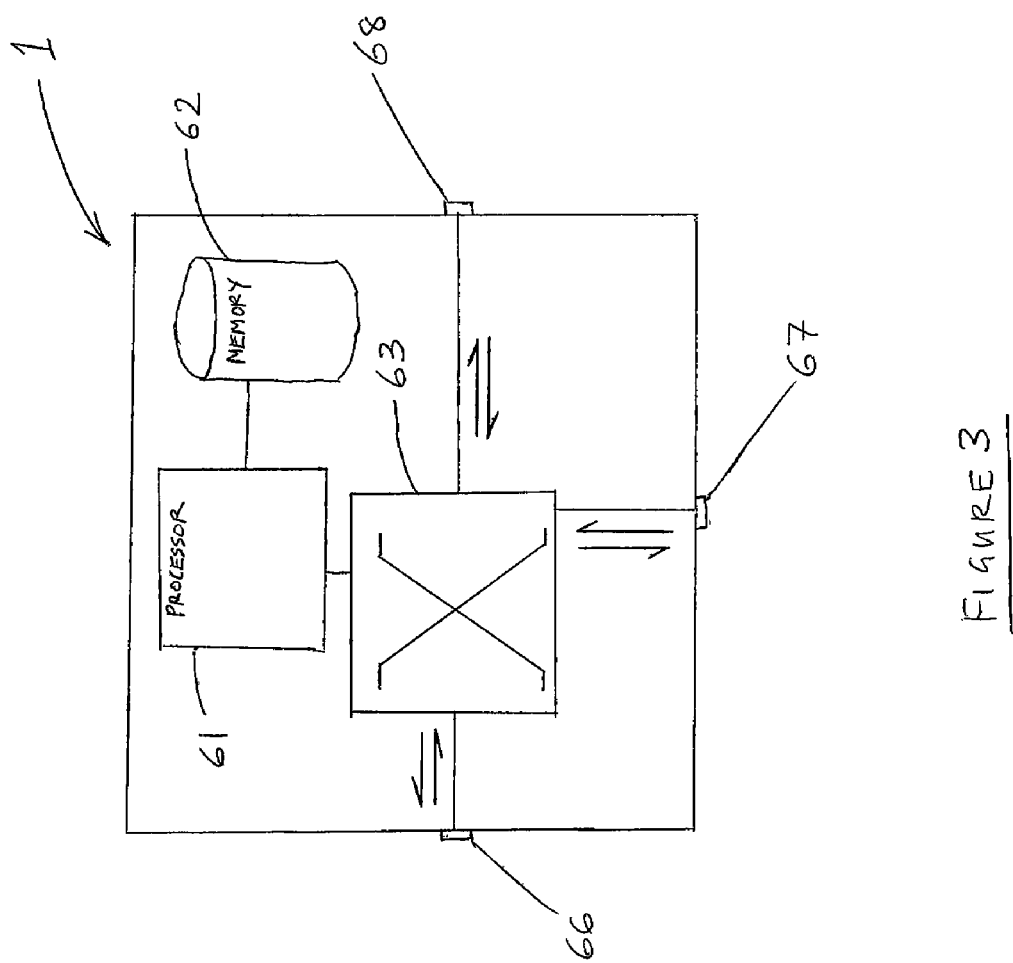
FIG. 3 is a communications node

It is to be noted that on receipt of the TCN-containing BDPU by the node 1 from the node 8, the processor 61 is aware that such a signal has been received at the port 66. In accordance with instructions stored in the memory 62, the processor 61 is operative to ensure that those entries in the FDB of memory 62 relating to the port 68 are not wiped and that a BPDU containing a TCN is not sent from the port 68 (and only to a subset of the ports, namely the port 67). Furthermore, the instructions in the memory 62 cause the processor to wipe those entries in its FDB relating to the port 67. Also, those instructions cause the TCN-containing BDPU output by the port 67 to include an identifier which is indicative of the fact that a TCN was received from the subnetwork 101. On receipt of the BDPU, the processor of the intermediary node 2 is configured by its respective memory to take the appropriate actions outlined above. The steps which are taken by the intermediary nodes 1 and 2 are outlined as steps 201 to 207 in the flow diagram 200 shown in FIG. 2. As can be seen from FIG. 1, by the intermediary nodes being configured to determine the origin (e.g. a particular subnetwork or an intermediary node) in the network of a received TCN, the extent of the wiping of FDB entries and the outputting of TCN's is advantageously localised within the region shown as 'FDB Flush area'.

Figure 4:
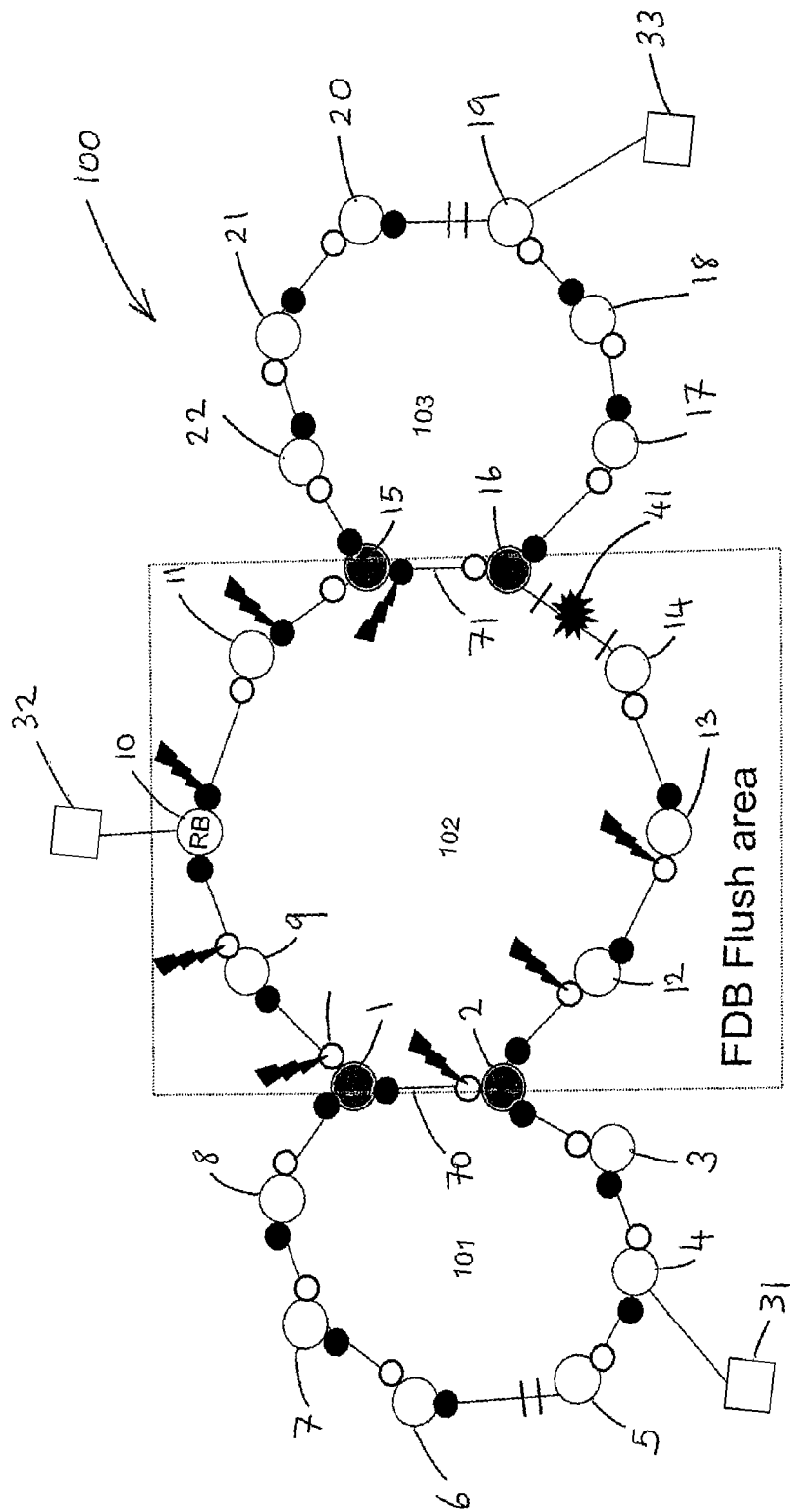
FIG. 4 is a communications network
Figure 5:
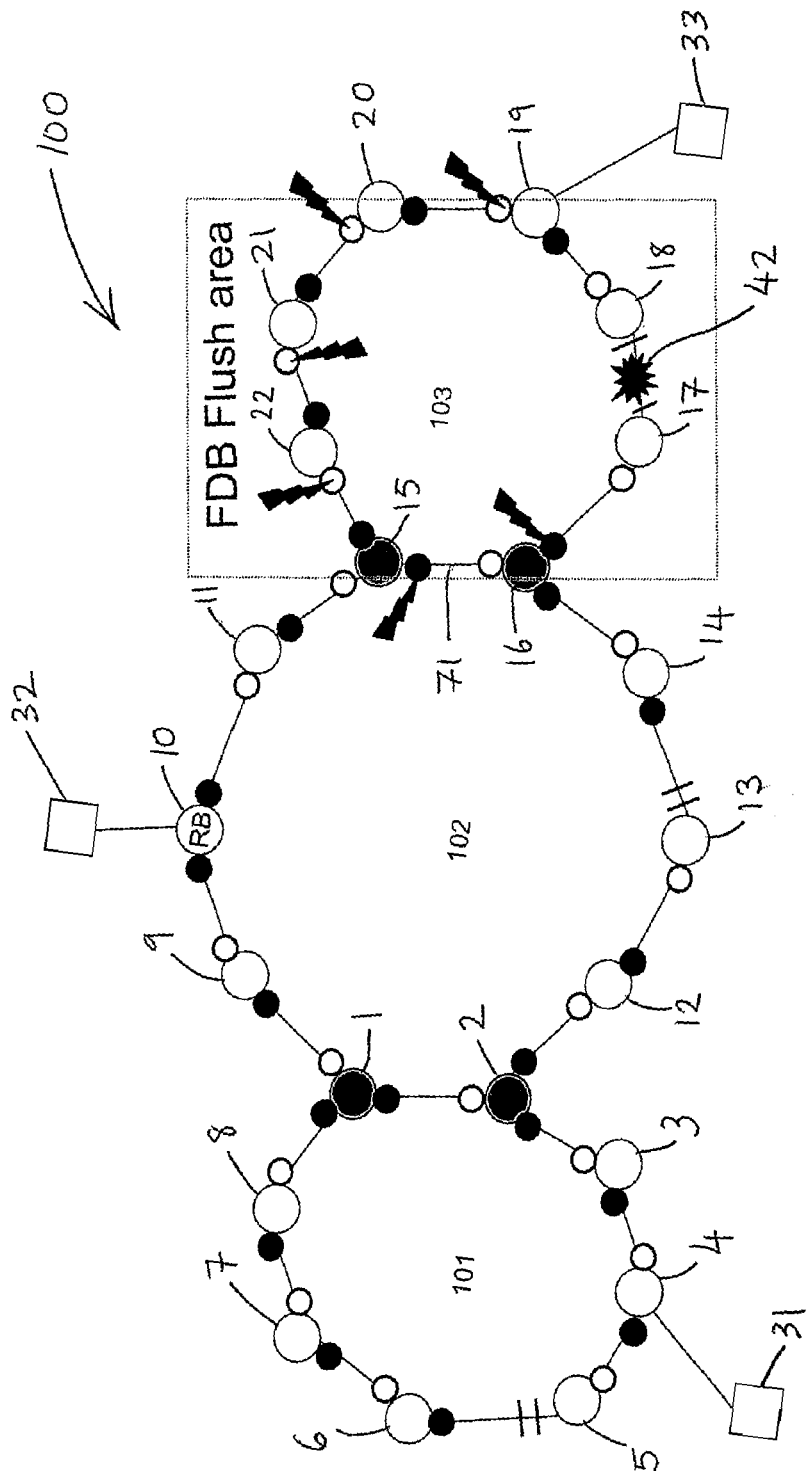
FIG. 5 is a communications network.

FIGS. 4 and 5 show how faults 41 and 42, which occur in the subnetworks 102 and 103 respectively, result in flooding of TCN's and flushing which is restricted within a respective subnetwork and do not extend to either of the other two subnetworks.

As mentioned above, each of the intermediary nodes 1, 2, 15 and 16 is capable of distinguishing between signals received at different ports by way of assigning a respective attribute to each port. The respective memories of the intermediary nodes store a plurality of port identifiers (which identify the different ports of the intermediary nodes) and a plurality of associated attribute identifiers called SubdomainIDs The attribute identifiers relate to three different cases:

(a) Port is connected to a link towards a certain subnetwork X;

(b) Port is connected to a link to the counterpart intermediary node;

(c) Port is not connected to a link belonging to the spanning tree domain, and thus it does not participate in the spanning tree protocol.

Accordingly, an attribute identifier of type (a) is indicative that a port is in a link connect state in which the port is connected to a certain subnetwork. The attribute identifier type (b) is indicative that a port is in a link connect state in which it is connected to the other intermediary node. The attribute identifier type (c) is indicative of the port being in a link connect state in which it is connected to a link which does not participate in the spanning tree protocol. In the manner described above the attribute identifiers enable the recipient intermediary node to determine the origin of a received TCN, namely whether the TCN originates from a (node of a) particular subnetwork, an intermediary node or from a node not belonging to spanning tree protocol. In this regard each of the ports 66, 67 and 68, in combination with the processor 61, the memory 62 and the switch 63 may be viewed as a traffic interface arranged to determine that a port is in a particular link connect state.

The SubDomainID comprises an integer (for example an eight bit integer), and has a predetermined value for each of cases (b) and (c), and several values for the case (a), each value uniquely identifying each of the different subnetworks.

Additionally, another field can be appended to the SubDomainID, in order to provide a more user-friendly indication of the subnetwork to the operator called "SubDomainName". Such human-readable data can be any of several types. For example, the SubDomainName field could be numeric, such as an integer, so that one value is reserved for the case (c), another value is reserved to above case (b), and several values are reserved to uniquely identify in a spanning tree domain the different subnetworks. Alternatively, or in addition, the SubDomainName field could be alphanumeric, such as a string, so that one string is reserved to above case (c) (e.g. "none"), another one reserved to above case (b) (e.g. "intermediary"), and several numbers available to uniquely identify in a spanning tree domain the different sub-networks (e.g. "sub_1", "main", "ProviderX").

The various SubDomainID and SubDomainName values are stored in the memory 62 of each of the intermediary nodes 1 and 2 and, in use, the determined SubDomainID and SubDomainName values are appended at the tail of the BPDU signal output by the respective intermediary node to the other intermediary node. It will be appreciated that the SubDoaminID and the SubDomainName values may conveniently be written in a field of the BPDU which is not carrying information. It will be appreciated, however, that as there is a one-to-one relationship between SubdomainID and the SubDomainName, it may be sufficient that only SubDomainID information is carried in the BPDU, which SubDomainID can then be mapped to the respective SubDomainName by the other recipient node.

Although in the above embodiment the origin of a status change signal such as a TCN is determined by way of determining a port at which the signal is received, in alternative embodiments, the processor of an intermediary node can be configured to determine the origin of a status change signal at least in part from the information within the received status change signal.

Figure 6:
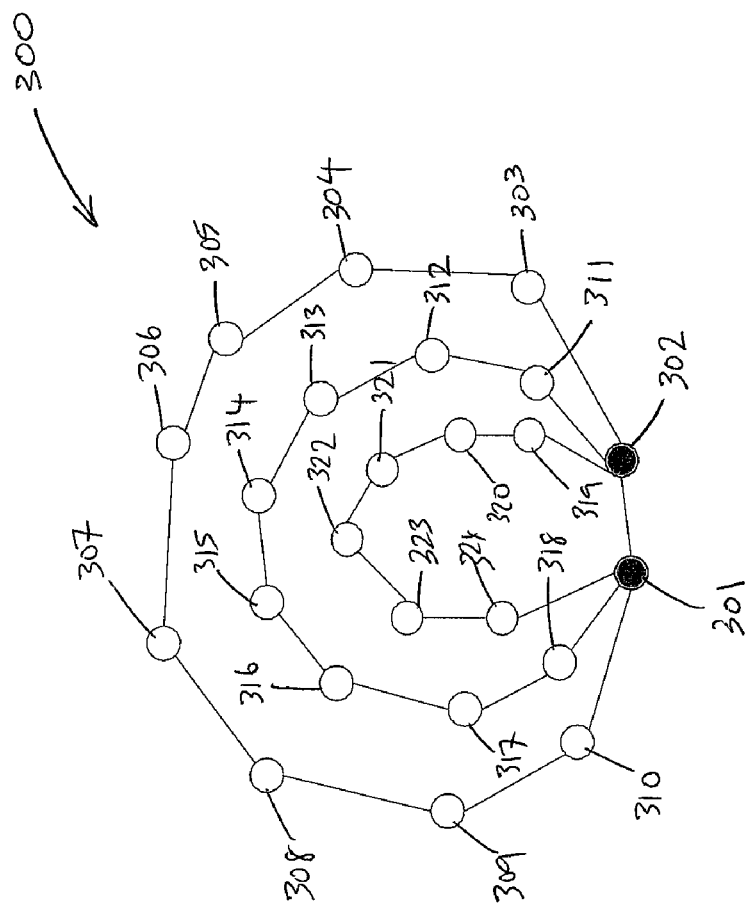
FIG. 6 is a communications network.

FIG. 6 shows a communications network 300 which comprises nodes 303 to 324 which constitute three subnetworks, and the network 300 further comprising intermediary nodes 301 and 302. A first subnetwork comprises the nodes 319 to 324 (and respective communications links), a second subnetwork comprises the nodes 311 to 318 (and the respective communications links) and a third subnetwork comprises the nodes 303 to 310 (and the respective communications links). The intermediary nodes 301 and 302 are substantially identical to the intermediary nodes 1 and 2 save that a respective processor of each is configured to ensure that a topology change accruing in one subnetwork does not result in flushing and flooding in any of the other subnetworks

The invention claimed is:

1. A node for a communications network, the node comprising:
a plurality of ports;
a processor, the processor configured to determine that a first status change signal, indicative of a topology status change in the network, has been received, wherein the first status change signal is embedded in a Bridge Protocol Data Unit (BDPU) of an implementation of a spanning tree protocol (STP), and the processor further configured to decide from at least an origin of the first status change signal to output a second status change signal to only a subset of possible destination nodes;
a memory, the memory configured to store a filter/forwarding database (FDB), wherein the FDB contains associations between traffic destination identifiers and the ports of the node; and on receipt of the first status change signal, the processor is further configured to remove from the memory an association relating to a first port from which a second status change signal is to be sent, and to retain in the memory an association relating to a second port which the processor has inhibited the second status change signal from being sent, wherein each port of the ports of the node is associated with a subdomain identifier (ID), and wherein the subdomain ID is related to one of cases including that any port is connected to a link toward a subnetwork of the communication network, any port is connected to a link to a node connecting to at least two subnetworks, and any port is connected to a link does not support the implementation of a STP.

2. A node as claimed in claim 1, wherein the processor is further configured to determine at which port of the node to output the second status change signal based on said at least an origin of the first status change signal.

3. A node as claimed in claim 2, wherein the processor is further configured to output the second status change signal from a subset of the ports of the node based on said at least an origin of the first status change signal.

4. A node as claimed in claim 1, wherein the processor is further configured to inhibit the second status change signal being output to at least one particular destination based on said at least an origin of the first status change signal.

5. A node as claimed in claim 1, in which the second status change signal comprises data indicative of the origin of the first status change signal.

6. A node as claimed in claim 5 in which the data indicative of the origin of the first status change signal comprises an identifier relating to the port of the node at which the first status change signal is received.

7. A node as claimed in claim 1, wherein the processor is further configured to determine the origin of the first status change signal at least on the basis of which port of the node the first status change signal was received.

8. A node as claimed in claim 1, wherein the topological status change signal is indicative a fault event.

9. A communications network comprising:
a node for the communications network, wherein the node is an intermediary node, wherein the intermediary node is located intermediate of at least two subnetworks of the network, and wherein the intermediary node is connected to at least one node of each of the subnetworks, the node including:
a plurality of ports;
a processor, the processor configured to determine that a first status change signal, indicative of a topology status change in the network, has been received, wherein the first status change signal is embedded in a Bridge Protocol Data Unit (BDPU) of an implementation of a spanning tree protocol (STP), and the processor further configured to decide from at least an origin of the first status change signal to output a second status change signal to only a subset of possible destination nodes;
a memory, the memory configured to store a filter/forwarding database (FDB), wherein the FDB contains associations between traffic destination identifiers and the ports of the node; and
on receipt of the first status change signal, the processor is further configured to remove from the memory an association relating to a first port from which a second status change signal is to be sent, and to retain in the memory an association relating to a second port which the processor has inhibited the second status change signal from being sent, wherein each port of the ports of the node is associated with a subdomain identifier (ID), and wherein the subdomain ID is related to one of cases including that any port is connected to a link toward a subnetwork of the communication network, any port is connected to a link to a node connecting to at least two subnetworks, and any port is connected to a link does not support the implementation of a STP.

10. A communications network as claimed in claim 9, which further comprises a further intermediary node, the intermediary nodes connected by a communications link.

11. A method of operation of a node of a communications network, the node comprising a plurality of ports and a processor, the method comprising:
determining that a first status change signal, indicative of a topology status change in the network, has been received by the node, wherein the first status change signal is embedded in a Bridge Protocol Data Unit (BDPU) of an implementation of a spanning tree protocol (STP), and
deciding from at least an origin of the first status change signal, to output a second status change signal from the node to only a subset of the possible destination nodes, wherein the node contains a filter/forwarding database (FDB), and wherein the FDB contains associations between traffic destination identifiers and the ports of the node;
on receipt of the first status change signal, the processor is further configured to remove from the memory an association relating to a first port from which a second status change signal is to be sent, and to retain in the memory an association relating to a second port which the processor has inhibited the second status change signal from being sent, wherein each port of the ports of the node is associated with a subdomain identifier (ID), and wherein the subdomain ID is related to one of cases including that any port is connected to a link toward a subnetwork of the communication network, any port is connected to a link to a node connecting to at least two subnetworks, and any port is connected to a link does not support the implementation of a STP.

12. A method as claimed in claim 11, further comprising determining the origin of the first status change signal at least on the basis of which one of the ports of the node received the first status change signal.

13. A non-transitory machine-readable storage medium that provides instructions that, when executed by a processor of a node of a communications network, causes the processor of the node to perform operations comprising:
determining that a first status change signal, indicative of a topology status change in the network, has been received by the node, wherein the first status change signal is embedded in a Bridge Protocol Data Unit (BDPU) of an implementation of a spanning tree protocol (STP), and
deciding from at least an origin of the first status change signal, to output a second status change signal from the node to only a subset of the possible destination nodes, wherein the node contains a filter/forwarding database (FDB), and wherein the FDB contains associations between traffic destination identifiers and the ports of the node; and
on receipt of the first status change signal, the processor is further configured to remove from the memory an association relating to a first port from which a second status change signal is to be sent, and to retain in the memory an association relating to a second port which the processor has inhibited the second status change signal from being sent, wherein each port of the ports of the node is associated with a subdomain identifier (ID), and wherein the subdomain ID is related to one of cases including that any port is connected to a link toward a subnetwork of the communication network, any port is connected to a link to a node connecting to at least two subnetworks, and any port is connected to a link does not support the implementation of a STP.

14. The non-transitory machine-readable storage medium of claim 13, wherein the non-transitory machine-readable storage medium provides further instructions, that when executed by the processor, cause the processor to perform the following operation:

determining the origin of the first status change signal at least on the basis of which one of a plurality of ports of the node received the first status change signal.

\* \* \* \* \*